(12) United States Patent
Flühs et al.

(10) Patent No.: US 12,500,022 B2
(45) Date of Patent: Dec. 16, 2025

(54) ELECTROMAGNET FOR PRODUCING A LINEAR MOVEMENT

(71) Applicant: SOLERO TECHNOLOGIES VILLINGEN GMBH, Villingen-Schwenningen (DE)

(72) Inventors: Joachim Flühs, Villingen-Schwenningen (DE); Frank Zelano, St. Georgen (DE)

(73) Assignee: Solero Technologies Villingen GMBH, Villingen Schwenningen (DE)

( * ) Notice: Subject to any disclaimer, the term of this patent is extended or adjusted under 35 U.S.C. 154(b) by 149 days.

(21) Appl. No.: 18/268,551

(22) PCT Filed: Oct. 20, 2021

(86) PCT No.: PCT/EP2021/079055
§ 371 (c)(1),
(2) Date: Jun. 20, 2023

(87) PCT Pub. No.: WO2022/135766
PCT Pub. Date: Jun. 30, 2022

(65) Prior Publication Data
US 2024/0079171 A1 Mar. 7, 2024

(30) Foreign Application Priority Data
Dec. 21, 2020 (DE) .................. 102020134522.4

(51) Int. Cl.
*H01F 7/16* (2006.01)
*H01F 7/08* (2006.01)
*H01F 27/28* (2006.01)

(52) U.S. Cl.
CPC .......... *H01F 7/1607* (2013.01); *H01F 7/081* (2013.01); *H01F 27/28* (2013.01); *H01F 2007/086* (2013.01)

(58) Field of Classification Search
None
See application file for complete search history.

(56) References Cited

U.S. PATENT DOCUMENTS

| | | | | |
|---|---|---|---|---|
| 4,546,955 A | * | 10/1985 | Beyer ................. | F16K 31/0679 251/129.1 |
| 8,434,734 B2 | * | 5/2013 | Birkelund .............. | F16K 31/06 335/265 |
| 2018/0347722 A1 | | 12/2018 | Bahr et al. | |

FOREIGN PATENT DOCUMENTS

| | | |
|---|---|---|
| DE | 2807451 A1 | 9/1978 |
| DE | 102009008447 B4 | 2/2013 |
| EP | 2896813 A1 | 7/2015 |

OTHER PUBLICATIONS

Office Action issued Jul. 21, 2021, in corresponding application DE 10 2020 134 522.4.

* cited by examiner

*Primary Examiner* — Bernard Rojas
(74) *Attorney, Agent, or Firm* — Nath, Goldberg & Meyer; Jerald L. Meyer

(57) ABSTRACT

An electromagnet for producing a linear movement includes a housing, an exciter coil arranged in the housing, a pole core and an armature assembly, which is mounted centrally in the exciter coil and has a displaceable main armature and a displaceable armature disc. In the de-energized state of the exciter coil, an air gap is formed between the main armature and the armature disc and, The armature assembly has an elastic element, the preload force of which can produce an elastic force fit between the main armature and the armature disc in the energized state of the exciter coil in such a way that the armature disc is moveable towards the pole core, thereby producing the air gap, as soon as the magnetic force falls below the preload force. The electromagnet as an (Continued)

actuator thus acts alone with a defined spring preload and spring rate of the elastic element.

9 Claims, 2 Drawing Sheets

ELECTROMAGNET FOR PRODUCING A LINEAR MOVEMENT

CROSS-REFERENCE TO RELATED APPLICATIONS

This is a National Phase Application filed under 35 U.S.C. 371 as a national stage of PCT/EP2021/079055, filed Oct. 20, 2021, an application claiming the benefit of German Application No. 10 2020 134 522.4 filed Dec. 21, 2020, the content of each of which is hereby incorporated by reference in its entirety.

FIELD

The invention relates to an electromagnet for producing a linear movement having a centrally mounted armature assembly in an exciter coil.

BACKGROUND

EP 1 288 481 B1 describes a generic electromagnet, according to which an armature assembly has a main armature and an armature plate, with the armature plate being mounted at a distance from the main armature in the de-energized state of an exciter coil of the electromagnet, forming an air gap. The armature plate is connected to a sleeve that is displaceably mounted in a magnetic core. The armature plate is kept by this sleeve in the de-energized state of the exciter coil in an initial position so that, when current is applied to the exciter coil, the main armature is firstly moved to the armature plate, while overcoming the air gap, and then the main armature with the attached armature plate, that is the entire armature assembly together with the sleeve, is moved in the direction of the magnetic core.

In this known electromagnet a valve actuator is guided, starting from the main armature, through the sleeve and interacts with an exhaust gas recirculation valve, which has a valve closing element arranged in a valve housing, which in turn interacts with a valve seat. A restoring spring, which is supported on the valve housing, is preloaded relative to a coupling piece which connects the sleeve of the electromagnet to the valve closing element. The restoring spring thus acts on the coupling piece, the sleeve, the valve closing member, and the valve actuator, which causes them to go back into the initial position.

Thus, in this known electromagnet, the valve actuator thereof does not interact directly with the valve closing element of the exhaust gas recirculation valve, but indirectly via the sleeve and the coupling piece, which forms a elastic force fit with the return spring. This high number of components is disadvantageous and leads to high production costs.

It is also known to equip proportional magnets or proportional valves driven by electromagnets with a failsafe function in order to ensure emergency operation in the event of a malfunction, in particular in the event of a power failure, in which the armature plunger is brought into a defined position or a predefined force is produced in order to set a defined flow a valve or to interrupt a flow, for example, in a valve. To implement such a failsafe function, a preloaded spring is used as a so-called failsafe spring, against which the electromagnetic drive has to work and therefore disadvantageously leads to high energy consumption.

The invention is therefore based on the objective of specifying an improved electromagnet of the type mentioned at the beginning with a simple structure, which in particular has a failsafe function.

SUMMARY

This objective is achieved by an electromagnet with the features of:
- a hollow cylindrical housing,
- an exciter coil arranged in the housing,
- a pole core fixed with respect to the housing, and
- an armature assembly mounted centrally in the exciter coil with a main armature that can be displaced relative to the housing and an armature disc that can be displaced relative to the housing, wherein
- in the de-energized state of the exciter coil, an air gap is formed between the main armature and the armature disc, and, in the energized state of the exciter coil, the main armature and the armature disc abut against one another.

According to the invention, the armature assembly has an elastic element, with the preload force of which, when the exciter coil is energized, an elastic force fit can be produced between the main armature and the armature disc in such a way that, if the preloading force is not reached, the armature disc can be moved against the pole core by means of a magnetic force in the armature assembly caused by the energized exciter coil, while producing the air gap.

By integrating an elastic element, preferably designed as a failsafe spring, into the armature assembly, it is possible for the armature disc and the main armature to attract one another, while overcoming an air gap, when the field coil is energized, in particular when a brief and high current is applied, as a result of which the failsafe spring is tensioned and thus a slightly higher preload force in comparison to the preload force in the de-energized state of the exciter coil is produced as an elastic force fit. Only when the current drops below a minimum value, whereby the magnetic force produced by energizing the exciter coil in the armature assembly falls below the preload force of the failsafe spring, is the armature disc moved against the pole core due to the preload force, forming the air gap. If the main armature is not in its rest position in this constellation, it is also moved into this rest position.

The advantage of such an arrangement of a 2-piece armature assembly with an integrated failsafe spring is that the state of the armature disc abutting the main armature can be maintained in a stable manner with such a current which is lesser in comparison with the current to preload the failsafe spring while overcoming the air gap. The reason for this can be seen in the magnetic resistance produced by the air gap, which has to be overcome with a higher current intensity, in order then, that is with the armature disc lying against the main armature, to vary the magnetic force in the armature assembly in a wide current range between the current intensities mentioned. Thus, when the armature disc abuts against the main armature, the armature assembly acts like a single-piece armature. The electromagnet according to the invention can thus be operated in an energy-efficient manner as an actuator.

The elastic element is preferably designed in such a way that, when the exciter coil is de-energized, a defined preload force can be produced by means of the elastic element when the armature disc abuts against the pole core, forming the air gap.

In the case of a de-energized exciter coil, for example if the power supply to the electromagnet fails, only the elastic element acts outwardly with a defined spring preload and a defined spring rate via the armature disc abutting against the pole core.

In an advantageous development of the invention,
the armature disc has a guide bolt,
the main armature has a blind hole for displaceably receiving the guide bolt, and
the elastic element is arranged in the blind hole and is supported firstly against a hole bottom of the blind hole and secondly against the guide bolt.

Such an armature assembly represents a simple mechanical structure that can be implemented cost-effectively and is extremely functionally reliable.

It is particularly advantageous if, according to a further preferred embodiment of the invention, the pole core has a guide bush for displaceably receiving an armature plunger and the armature plunger is frictionally connected to the armature disc. An armature assembly, including an armature plunger, is thus created with only a few components.

A further advantage results from the fact that the main armature is arranged so as to be displaceable in a pot-shaped flow guide tube with a bottom. This reduces the assembly complexity of the electromagnet.

Finally, the elastic element is implemented inexpensively by a compression spring.

BRIEF DESCRIPTION OF THE DRAWINGS

The invention is described in detail below using an exemplary embodiment with reference to the accompanying figures, in which.

DETAILED DESCRIPTION

Figure 1:
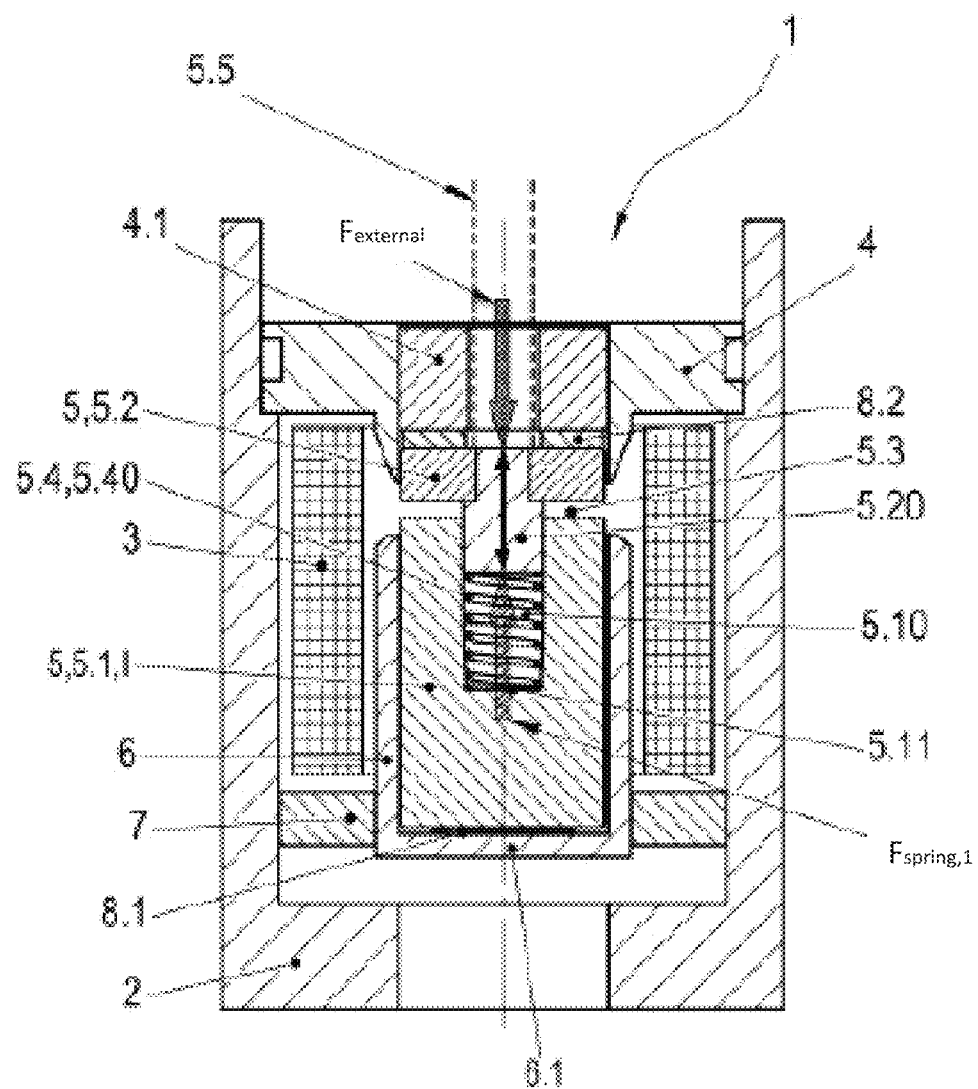
FIG. 1 is a schematic sectional view of an electromagnet according to the invention in a de-energized state.
Figure 2:
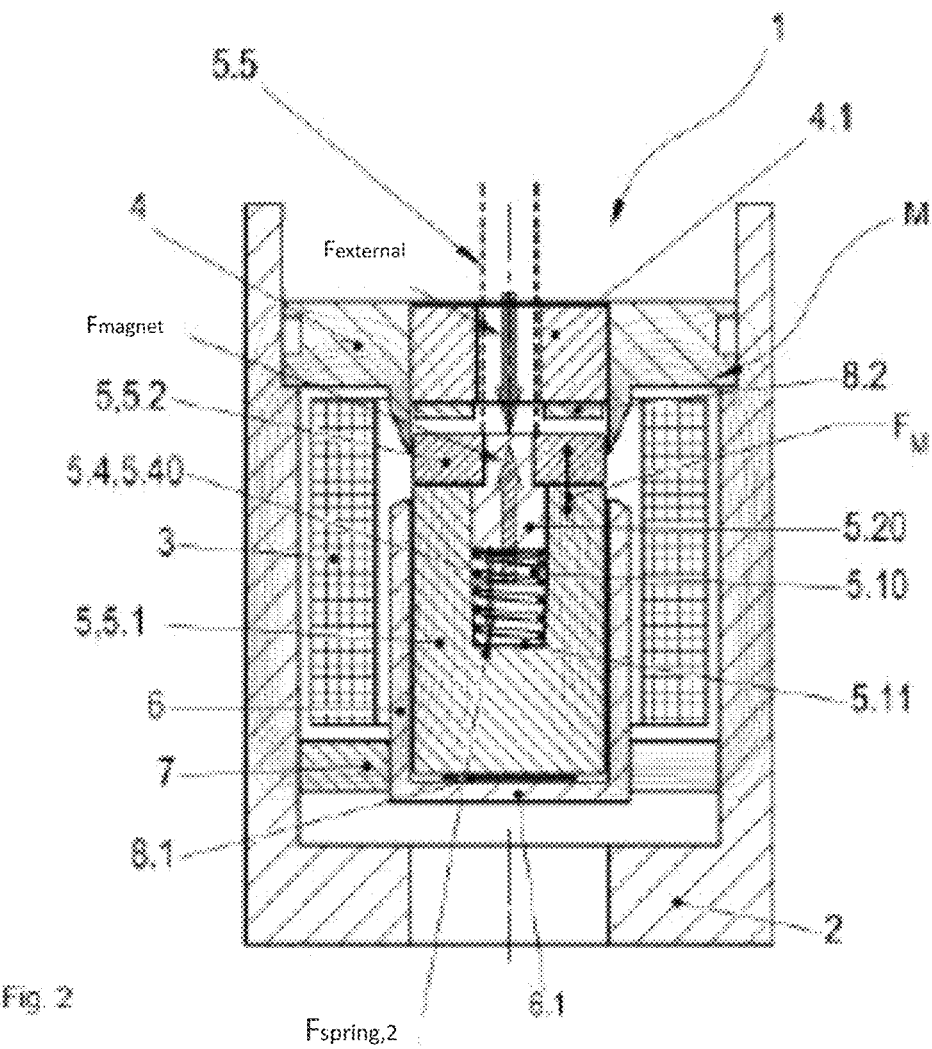
FIG. 2 shows a schematic representation of the electromagnet according to FIG. 1 in an energized state.

The electromagnet 1 that can be used as an actuator according to FIGS. 1 and 2 is designed as a proportional magnet and comprises the following components:

a hollow-cylindrical housing 2 with a pot-shaped geometry,
an exciter coil 3 arranged in the housing 2,
an armature assembly 5 which is arranged centrally relative to the exciter coil 3 in a pot-shaped flow guide tube 6 and comprises a main armature 5.1 made of magnetic material that can be displaced relative to the flow guide tube 6 and thus also relative to the housing 2, and an armature disc 5.2 made of magnetic material that can be displaced relative to the main armature 5.1, wherein the armature disc 5.2 is connected centrally to a non-magnetic guide bolt 5.20, which protrudes displaceably into a blind hole 5.10 in the main armature 5.1,
an elastic element 5.4, which is designed as a compression spring 5.40 and is arranged as a failsafe spring in the blind hole 5.10, wherein the compression spring 5.40 is supported firstly on the hole bottom 5.11 of the blind hole 5.10 and secondly on the guide bolt 5.20 of the armature disc 5.2,
a return plate 7, with which the flow guide tube 6 is held centrally in the region of its bottom 6.1 in the housing 2, the diameter of the return plate 7 corresponding to the inner diameter of the housing 2,
a pole core 4 connected to the housing 2 in a frictional or form-fit manner with a centrally arranged guide bush 4.1, through which a schematically illustrated armature tappet 5.5 is guided and frictionally connected to the armature disc 5.2, wherein the armature tappet 5.5 is used as an actuator for actuating an actuator, for example a valve,
an anti-adhesive disc 8.1 arranged on the bottom 6.1 of the flow guide tube 6, and
an additional anti-adhesive disc 8.2 arranged between the guide bush 4.1 of the pole core 4 and the armature disc 5.2.

In the case of the electromagnet 1 according to FIGS. 1 and 2, the armature tappet 5.5 can be omitted if the actuating force of the electromagnet 1 is taken directly from the armature disc 5.2 or the guide bolt 5.20.

Further details of the electromagnet 1, such as electrical connection lines for the exciter coil 3, are not shown for the sake of clarity. Film mounting of the main armature 5.1 and the armature disc 5.2 in the flow guide tube 6 by means of a sliding film is not shown in FIGS. 1 and 2 either.

FIGS. 1 and 2 show the electromagnet 1 in different operating states, which are explained below.

A de-energized state of the electromagnet 1 is shown in FIG. 1. In this state, there is no magnetic field in the armature assembly 5, but only a preload force with a first value $F_{Spring,1}$ of the compression spring 5.40 that is arranged and preloaded in the blind hole 5.10. Due to this preload force $F_{Spring,1}$, the armature disc 5.2 is pressed against an external force $F_{external}$ acting on the armature plunger 5.5, forming an air gap 5.3 between said disc and the main armature 5.1, onto the anti-adhesive disc 8.2 resting on the guide bush 4.1 of the pole core 4. In this de-energized state, the main armature 5.1 is in a rest position I, in which the main armature 5.1 abuts against the bottom 6.1 of the flow guide tube 6 via the anti-adhesive disc 8.1.

In this position, the armature disc 5.2 is pressed against the external force $F_{external}$ onto the pole core 4 by the preloaded compression spring 5.40, thus achieving a failsafe function, that is, the valve tappet 5.5 is brought into a defined position as an emergency position according to FIG. 1. In this case, the compression spring 5.40 acts alone with its defined spring preload and defined spring rate.

A magnetic circuit M shown in FIG. 2 is created by applying current implemented, for example, as a pulse current with a high current value $I_{max}$ so that the main armature 5.1 and the armature disc 5.2 attract one another with a magnetic force F M until the armature disc 5.2 and the main armature 5.1, while overcoming the air gap 5.3, abut against one another completely against the preload force of the compression spring 5.40, wherein the preload force of the compression spring 5.40 increases to a second value$_{Spring,2}$. This means that the failsafe function is switched off or "bridged."

If the armature disc 5.2 and the main armature 5.1 are in contact without an air gap, a current value I ($I \leq I_{max}$) that is lower than the current value $I_{max}$ is sufficient to keep the pressure spring 5.40 acting as a failsafe spring in the loaded state when the armature disc 5.2 is in contact with the main armature 5.1. In this state, the main armature 5.1 acts with the adjacent armature disc 5.2 like a single-piece armature, on which a magnetic force $F_{Magnet}$ engages. Depending on the difference in the value of this magnetic force $F_{Magnet}$ and the external force $F_{external}$ directed against said magnetic force $F_{Magnet}$, the armature group 5 is moved in the direction of the pole core 4, starting from the rest position I of the main armature 5.1.

Figure 3:
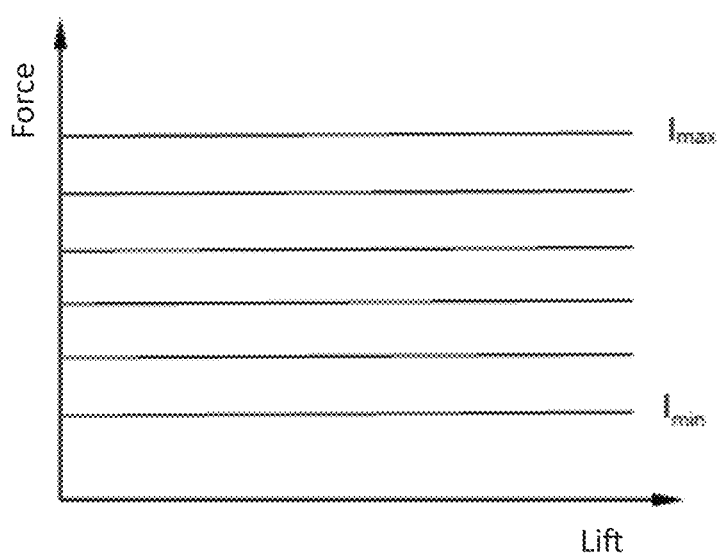
FIG. 3 is a stroke-force diagram to explain the functioning of the electromagnet according to FIGS. 1 and 2.

The value of this magnetic force $F_{Magnet}$ can vary in a wide current range between the current value $I_{max}$ and a minimum current value $I_{min}$, as shown in FIG. 3.

The parameter of the set of curves shown in the stroke-force diagram is the current I of the exciter coil 3. From this, it can be seen that the failsafe function remains switched off as long as the current I of the field coil has a value between $I_{max}$ and $I_{min}$.

If the current value I falls below the minimum current value $I_{min}$ ($I \leq I_{min}$), the magnetic force $F_M$ acting between the main armature 5.1 and the adjacent armature disc 5.2 falls below the second value $F_{Spring,2}$ of the preload force of the compression spring 5.40, as a result of which the main armature 5.1 and the armature disc 5.2 are separated, while forming the air gap 5.3. The state of the electromagnet 1 according to FIG. 1 occurs again, that is, the compression spring 5.40 is again effective as a failsafe spring and the failsafe function is therefore switched on.

The spring preload of the compression spring 5.40 used as a fail-safe spring can be set, for example, to an average value between the magnetic force produced with the minimum current value $I_{min}$ and that produced with the maximum current value $I_{max}$. If, in this case, a spring connected in series with the main armature 5.1 is used, the actuating force of the electromagnet 1 in the energized state would always be greater than the force of the compression spring 5.40.

LIST OF REFERENCE NUMERALS 1 electromagnet
2 housing
3 exciter coil
4 pole core
4.1 guide bush of the pole core 4
5 armature assembly
5.1 main armature of armature assembly 5
5.10 blind hole of the main armature 5.1
5.11 hole bottom of the blind hole 5.10
5.2 armature plate of the armature assembly 5
5.20 guide bolt of the armature disc 5.2
5.3 air gap
5.4 elastic element
5.40 compression spring
5.5 armature plunger
6 flow guide tube
6.1 bottom of the flow guide tube 6
7 return plate
8.1 anti-adhesive disc
8.2 anti-adhesive disc
$F_{external}$ external force acting on the armature tappet 5.5, the armature disc 5.2, or the guide bolt 5.20
$F_{Spring,1}$ spring force of the compression spring 5.40
$F_{Spring,2}$ spring force of the compression spring 5.40
$F_M$ magnetic force between main armature 5.1 and armature disc 5.2
$F_{Magnet}$ magnetic force on the armature assembly 5
I rest position of the main armature 5.1
M magnetic circuit

The invention claimed is:

1. An electromagnet (1) for producing a linear movement, comprising:
   a hollow cylindrical housing;
   an exciter coil (3) arranged in the housing;
   a pole core (4) fixed relative to the housing (2); and
   an armature assembly (5) centrally mounted in the exciter coil (3) with a main armature (5.1) that can be displaced relative to the housing, and an armature disc (5.2) that can be displaced relative to the housing (2), wherein
   when the exciter coil (3) is de-energized, an air gap (5.3) is formed between the main armature (5.1) and the armature disc (5.2) and, when the exciter coil (3) is energized, the main armature (5.1) and the armature disc (5.2) abut against one another,
   characterized in that
   the armature assembly (5) has an elastic element (5.4), with a preload force of which, when the exciter coil (3) is energized, an elastic force fit can be produced between the main armature (5.1) and the armature disc (5.2) in such a way that, if the preload force is not reached, the armature disc (5.2) can be moved against the pole core (4) by means of a magnetic force in the armature assembly (5) caused by the energized exciter coil (3), while producing the air gap (5.3) when the magnetic force falls below the preload force;
   the pole core (4) has a guide bush (4.1) for displaceably receiving an armature tappet (5.5) and
   the armature tappet (5.5) is frictionally connected to the armature disc (5.2).

2. The electromagnet (1) according to claim 1, characterized in that the elastic element (5.4) is designed in such a way that a defined preload force can be produced by means of the elastic element (5.4) when the exciter coil (3) is de-energized.

3. The electromagnet (1) according to claim 1, characterized in that
   the armature disc (5.2) has a guide bolt (5.20);
   the main armature (5.1) has a blind hole (5.10) for displaceably receiving the guide bolt (5.20); and
   the elastic element (5.4) is arranged in the blind hole (5.10) and is supported firstly against a hole bottom (5.11) of the blind hole (5.10) and secondly against the guide bolt (5.20).

4. The electromagnet (1) according to claim 1, characterized in that the main armature (5.1) is displaceably arranged in a pot-shaped flow guide tube (6) with a bottom (6.1).

5. The electromagnet (1) according to claim 1, characterized in that the elastic element (5.4) is a compression spring (5.40).

6. An electromagnet (1) for producing a linear movement, comprising:
   a hollow cylindrical housing (2);
   an exciter coil (3) arranged in the housing;
   a pole core (4) fixed relative to the housing (2); and
   an armature assembly (5) centrally mounted in the exciter coil (3) with a main armature (5.1) that can be displaced relative to the housing, and an armature disc (5.2) that can be displaced relative to the housing (2), wherein
   when the exciter coil (3) is de-energized, an air gap (5.3) is formed between the main armature (5.1) and the armature disc (5.2) and, when the exciter coil (3) is energized, the main armature (5.1) and the armature disc (5.2) abut against one another,
   characterized in that
   the armature assembly (5) has an elastic element (5.4), with a preload force of which, when the exciter coil (3) is energized, an elastic force fit can be produced between the main armature (5.1) and the armature disc (5.2) in such a way that, if the preload force is not reached, the armature disc (5.2) can be moved against the pole core (4) by means of a magnetic force in the armature assembly (5) caused by the energized exciter coil (3), while producing the air gap (5.3) when the magnetic force falls below the preload force;

the armature disc (5.2) has a guide bolt (5.20);

the main armature (5.1) has a blind hole (5.10) for displaceably receiving the guide bolt (5.20); and the elastic element (5.4) is arranged in the blind hole (5.10) and is supported firstly against a hole bottom (5.11) of the blind hole (5.10) and secondly against the guide bolt (5.20).

7. The electromagnet (1) according to claim 6, characterized in that the elastic element (5.4) is designed in such a way that a defined preload force can be produced by means of the elastic element (5.4) when the exciter coil (3) is de-energized.

8. The electromagnet (1) according to claim 6, characterized in that the main armature (5.1) is displaceably arranged in a pot-shaped flow guide tube (6) with a bottom (6.1).

9. The electromagnet (1) according to claim 6, characterized in that the elastic element (5.4) is a compression spring (5.40).

* * * * *